(12) United States Patent
Toufaili

(10) Patent No.: US 8,618,225 B2
(45) Date of Patent: Dec. 31, 2013

(54) METHOD FOR PRODUCING POLYAMIDES

(75) Inventor: Faissal-Ali El Toufaili, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 153 days.

(21) Appl. No.: 12/867,110

(22) PCT Filed: Feb. 6, 2009

(86) PCT No.: PCT/EP2009/051385

§ 371 (c)(1),
(2), (4) Date: Aug. 11, 2010

(87) PCT Pub. No.: WO2009/101032

PCT Pub. Date: Aug. 20, 2009

(65) Prior Publication Data

US 2010/0311918 A1    Dec. 9, 2010

(30) Foreign Application Priority Data

Feb. 11, 2008 (EP) .................................. 08151256

(51) Int. Cl.
*C08G 69/28* (2006.01)
*C08G 69/16* (2006.01)

(52) U.S. Cl.
USPC ........... 525/420; 525/434; 525/435; 525/436; 528/335; 528/336; 528/342

(58) Field of Classification Search
USPC .......... 525/420, 434, 435, 436; 528/335, 336, 528/342
See application file for complete search history.

(56) References Cited

U.S. PATENT DOCUMENTS

| 2,071,250 | A | 2/1937 | Carothers |
| 2,071,251 | A | 2/1937 | Carothers |
| 2,130,523 | A | 9/1938 | Carothers |
| 2,130,948 | A | 9/1938 | Carothers |
| 2,241,322 | A | 5/1941 | Hanford |
| 2,312,966 | A | 3/1943 | Hanford |
| 2,512,606 | A | 6/1950 | Bolton et al. |
| 3,393,210 | A | 7/1968 | Speck |
| 4,537,949 | A | 8/1985 | Schmidt et al. |
| 4,540,772 | A | 9/1985 | Pipper et al. |
| 5,081,222 | A | 1/1992 | Reimann et al. |
| 5,218,082 | A | 6/1993 | Reimann et al. |
| 5,252,661 | A | 10/1993 | Reimann et al. |
| 5,298,595 | A | 3/1994 | Reimann et al. |
| 6,423,817 | B1 | 7/2002 | Weinerth et al. |
| 7,351,339 | B2 | 4/2008 | Maase et al. |
| 7,601,771 | B2 | 10/2009 | Schmidt et al. |
| 7,605,297 | B2 | 10/2009 | Maase et al. |
| 7,767,852 | B2 | 8/2010 | Volland et al. |
| 2005/0288484 | A1 | 12/2005 | Holbrey et al. |
| 2006/0047054 | A1* | 3/2006 | Wang et al. ................. 524/495 |
| 2008/0083606 | A1 | 4/2008 | Volland et al. |
| 2009/0112017 | A1 | 4/2009 | Sesing et al. |
| 2011/0144300 | A1 | 6/2011 | Desbois et al. |

FOREIGN PATENT DOCUMENTS

| DE | 4413177 | A1 | 10/1995 |
| DE | 10202838 | A1 | 8/2003 |
| DE | 10243181 | A1 | 1/2004 |
| EP | 0038094 | A2 | 10/1981 |
| EP | 0038582 | A2 | 10/1981 |
| EP | 0039524 | A1 | 11/1981 |
| EP | 129195 | A2 | 12/1984 |
| EP | 129196 | A2 | 12/1984 |
| EP | 299444 | A2 | 1/1989 |
| WO | WO-02/074718 | A1 | 9/2002 |
| WO | WO-02/079269 | A1 | 10/2002 |
| WO | WO-03/029329 | A2 | 4/2003 |
| WO | WO-2004/084627 | A2 | 10/2004 |
| WO | WO-2005/007657 | A2 | 1/2005 |
| WO | WO-2005/017001 | A1 | 2/2005 |
| WO | WO-2005/017252 | A1 | 2/2005 |
| WO | WO-2005/019137 | A1 | 3/2005 |
| WO | WO-2006/048171 | A1 | 5/2006 |
| WO | WO-2008/043837 | A1 | 4/2008 |

OTHER PUBLICATIONS

Gaymans, R.J., "Chapter 3 Polyamides" Synthetic Methods in Step-Growth Polymers, 2003, pp. 135-195.
Kubisa, P., "Application of ionic liquids as solvents for polymerization processes," Prog. Polym. Sci., 2004, vol. 29, pp. 3-12.
Lozinksaya E.I., et al., "Direct polycondensation in ionic liquids," European Polymer Journal, 2004, vol. 40, pp. 2065-2075.
Mallakpour, S., et al., "Use of ionic liquid and microwave irradiation as a convenient, rapid and eco-friendly method for synthesis of novel optically active and thermally stable aromatic polyamides containing N-phthaloyl-L-alanine pendent group," Polymer Degradation and Stability, 2008, vol. 93, pp. 753-759.
Vygodskii,Y.S., et al., "Implementation of ionic liquids as activating media for polycondensation processes," Polymer, 2004, vol. 45, pp. 5031-5045.
Vygodskii,Y.S., et al., "Ionic liquids as novel reaction media for the synthesis of condensation polymers," Macromol. Rapid Commun., 2002, vol. 23, pp. 676-680.

* cited by examiner

*Primary Examiner* — Ana Woodward
(74) *Attorney, Agent, or Firm* — Novak Druce Connolly Bove + Quigg LLP

(57) ABSTRACT

A process for preparing polyamides by reacting starting monomers selected from dicarboxylic acids and diamines or salts of dicarboxylic acids and diamines, amino carboxylic acids, amino nitriles, lactams and mixtures thereof, in the presence or absence of water and/or of functionalizing compounds capable of attaching to carboxyl or amino groups, which process comprises performing the reaction in an ionic liquid as solvent without use of additional accelerants.

5 Claims, No Drawings

METHOD FOR PRODUCING POLYAMIDES

CROSS-REFERENCE TO RELATED APPLICATIONS

This application is a national stage application (under 35 U.S.C. §371) of PCT/EP2009/051385, filed Feb. 6, 2009, which claims benefit of European application 08151256.8, filed Feb. 11, 2008.

FIELD OF THE INVENTION

The present invention relates to a process for preparing polyamides by reacting starting monomers selected from dicarboxylic acids and diamines or salts of the dicarboxylic acids and diamines, amino carboxylic acids, amino nitriles, lactams and mixtures thereof.

BACKGROUND OF THE INVENTION

Processes for preparing polyamides from dicarboxylic acids and diamines or from lactams such as caprolactam are well known. The processes are typically carried out at high temperatures, if necessary under superatmospheric pressure by admixture and later removal of an aqueous phase.

There have also been reports in the past about the preparation of polymers by reaction in ionic liquids.

WO 2006/048171 relates to the preparation of polyisocyanates by reaction of primary amines with phosgene in the presence of ionic liquids as solvents. Substituted imidazolium chlorides in particular are used as solvents.

WO 02/079269 describes the polymerization of vinylic starting monomers by free radical or thermal polymerization in ionic liquids.

Y. S. Vygodskii et al., in Macromol. Rapid Commun. 2002, 23, pages 676 to 680, describe ionic liquids useful as reaction media for the synthesis of condensation polymers. Aromatic diamines are reacted with anhydrides or with acyl chlorides of di- and tetracarboxylic acids, which leads to the preparation of polyamides and polyimides. The carboxylic acids have to be present in derivatized form.

E. I. Lozinskaya et al., in European Polymer Journal 40 (2004), pages 2065 to 2075, describe the direct polycondensation in ionic liquids. Similarly, the preparation of different polyamides from dicarboxylic acids and diamines is described, although in each case a 2.25-fold molar excess of diphenyl phosphite has to be used as an activating agent.

BRIEF SUMMARY OF THE INVENTION

It is an object of the present invention to provide a process for preparing polyamides by reaction of dicarboxylic acids and diamines or salts of the dicarboxylic acids and diamines, amino carboxylic acids, amino nitriles, lactams and mixtures thereof, at low temperatures in a solvent without additional use of additional accelerators.

We have found that this object is achieved according to the present invention by a process for preparing polyamides by reacting starting monomers selected from dicarboxylic acids and diamines or salts of the dicarboxylic acids and diamines, amino carboxylic acids, amino nitriles, lactams and mixtures thereof, in the presence or absence of water or of functionalizing compounds capable of attaching to carboxyl or amino groups, for example by having at least one carboxyl, hydroxyl or amino group, which process comprises performing the reaction in an ionic liquid as solvent without use of additional accelerants which, based on the monomers, are present in an amount of more than 50 mol %.

DETAILED DESCRIPTION OF THE PREFERRED EMBODIMENTS

Polyamides herein are polymers and oligomers, preferably polymers.

The inventors found that polyamides are obtainable from appropriate starting monomers in ionic liquids at low temperatures without having to use additional activator components such as triphenylphosphine. And that it is possible to additionally use functionalizing compounds. Preparation is effected without addition of additional accelerants which are present, based on the monomers, in an amount of more than 50 mol %, preferably more than 20 mol %, in particular more than 10 mol %. It is particularly preferable to perform the reaction entirely without use of additional accelerants. The ionic liquid is excepted in that statement, because the ionic liquid may have an accelerating effect.

The reaction may be carried out according to the present invention at a temperature in the range from 50 to 200° C., more preferably in the range from 130 to 170° C. and in particular in the range from 140 to 160° C.

We have found that the stated object is also achieved according to the present invention by a process for functionalizing polyamides by transamidation wherein the polyamides are dissolved in an ionic liquid and transamidated with functionalized monomers having at least one or preferably at least two amino and/or carboxyl groups. The inventors found that the low reaction temperatures enable transamidations to be carried out with monomers which are not stable under customary polycondensation conditions. Use of the ionic liquids according to the present invention makes it possible to keep the reaction temperature very low and yet achieve an effective transamidation.

We have found that the stated object is also achieved according to the present invention by a process for producing fibers, foils, films or coatings from polyamides, which comprises polyamides obtained by a process described above and being present as a solution in an ionic liquid being subjected from out of the solution to the further steps of fiber, foil, film or coating formation. Preferably, the solution is fed to the fiber, foil, film or coating formation stage without further pretreatment steps or intervening steps. If desired, some of the ionic liquid can be removed to obtain a more concentrated polyamide solution. Preferably, however, the polyamide is not separated from the ionic liquid before further reaction, but remains as a solution in the ionic liquid. The process of the present invention offers the advantage that the as-prepared polyamide, in the ionic liquid, can be directly subjected to further processing. This obviates intervening steps such as a workup of the solid and renewed dissolving. The process is in this respect particularly straightforward and inexpensive.

Any suitable ionic liquid can be used according to the present invention. Ionic liquids for the purposes of the present invention are compounds having at least one cationic center and at least one anionic center, in particular which have at least one cation and at least one anion, one of the ions, in particular the cation, being organic.

According to the definition of Wasserscheid and Keim in: Angewandte Chemie 2000, 112, 3926-3945, ionic liquids are salts which melt at relatively low temperatures and have a nonmolecular, ionic character. They are liquid, with a relatively low viscosity, at relatively low temperatures. They have very good solvent capabilities for a large number of organic, inorganic and polymeric substances. They are also generally noncombustible, noncorrosive and have no measurable vapor pressure.

Ionic liquids are compounds which are formed by positive and negative ions, but have no overall charge. Both the positive ions and the negative ions are predominantly monovalent, but multivalent anions and/or cations, for example ions having one to five, preferably one to four, more preferably one to three and most preferably one or two electric charges per ion, are also possible. The charges can be situated on various localized or delocalized regions within a molecule, i.e., in betaine-like fashion, or else be distributed like a separate anion and cation. Preference is given to ionic liquids constructed of at least one cation and at least one anion.

Known fields of use for ionic liquids are in particular as solvents for chemical reactions, as auxiliaries for separating acids from chemical reaction mixtures, as described in DE 10202838, as auxiliaries for extractive rectification to separate close-boiling or azeotropic mixtures, as described in WO 02/074718, or as heat transfer media in solar thermal units, in accordance with the description in Proceeding of Solar Forum, 2001, April 21 to 25, Washington, D.C.

The present invention is not restricted to specific ionic liquids; any suitable ionic liquid can be used, including mixtures of various ionic liquids.

Ionic liquids have a more complex solvent behavior compared with traditional aqueous and organic solvents, since ionic liquids are salts and not molecular, nonionic solvents. For interactions between ionic liquids and dissolved polymers, reference may be made to US-A-2005 0288 484, paragraph [0039]. Ionic liquids are preferably in the liquid phase in a temperature range of −70 to 300° C. They should be thermally stable to preferably at least 100° C., preferably at least 150° C. and particularly at least 170° C. Nylon-6 pellet, for example, is dissolved at a temperature of 170° C. to obtain a 20% by weight solution.

Preference is given to ionic liquids having a very low melting point, in particular below 150° C., more preferably below 100° C. and even more preferably below 80° C.

The ionic liquid which functions as reaction medium may be selected so that it is substantially inert toward the substances participating in the reaction, or preferably catalyzes polyamide formation. Under the reaction conditions, it should be a liquid and have a solvent capability for the reaction products and intermediates which is sufficient for the reaction.

Ionic liquids are typically constructed with an organic cation, which is frequently obtained by alkylation of a compound, for example imidazoles, pyrazoles, thiazoles, isothiazoles, azathiazoles, oxothiazoles, oxazines, oxazolines, oxazaboroles, dithiozoles, triazoles, selenozoles, oxaphospholes, pyrroles, boroles, furans, thiophenes, phospholes, pentazoles, indoles, indolines, oxazoles, isoxazoles, isotriazoles, tetrazoles, benzofurans, dibenzofurans, benzothiophenes, dibenzothiophenes, thiadiazoles, pyridines, pyrimidines, pyrazines, pyridazines, piperazines, piperidines, morpholones, pyrans, anolines, phthalazines, quinazolines, quinoxalines and combinations thereof.

The cation in the ionic liquid is particularly preferably selected from the group consisting of quaternary ammonium cations, phosphonium cations, imidazolium cations, H-pyrazolium cations, pyridazinium cations, pyrimidinium ions, pyrazinium ions, pyrrolidinium cations, guanidinium cations, 5- to at least 6-membered cations comprising at least one phosphorus or sulfur atom, the 1,8-diazabicyclo[5.4.0]undec-7-enium cation and the 1,8-diazabicyclo[4.3.0]non-5-inium cation and oligo- and polymers comprising these cations.

For suitable ionic liquids, reference may be made to WO 2006/048171 for example.

The anionic part of the ionic liquid can be constructed of inorganic or organic anions. Typical examples thereof are halides, $BX_4^-$, $PF_6^-$, $AsF_6^-$, $SbF_6^-$, $NO_2^-$, $NO_3^-$, $SO_4^{2-}$, $BR_4^-$, substituted or unsubstituted carboranes, substituted or unsubstituted metallocarboranes, phosphates, phosphites, polyoxometalates, substituted or unsubstituted carboxylates, triflates and noncoordinating anions. R may comprise hydrogen, alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxyaryloxy, acyl, silyl, boryl, phosphino, amino, thio, seleno and combinations thereof. By altering the combination of cations and anions, one has the ability to fine-tune the ionic liquid with the desired solvent properties needed for a specific thermoplastic polymer.

The cation may be for example a single five-membered ring free of fusion to other ring structures. One example thereof is an imidazolium cation. In this case, the anion of the ionic liquid may be a halogen or pseudohalogen. For further description, reference may be made to US-A-2005 0288 484, paragraphs [0055] to [0062].

Room temperature ionic liquids useful in the present invention are described for example in WO 02/079269 at pages 13 to 16. Cations specified there include for example large, asymmetric organic cations such as N-alkylpyridinium, alkylammonium, alkylphosphonium and N,N'-dialkylimidazolium. The ionic liquids preferably have high stability and more preferably have a decomposition temperature in excess of 400° C. For example, dialkylimidazolium and alkylpyridinium have such high decomposition temperatures. 1-Alkyl-3-methylimidazolium salts may be particularly preferable, in which case $PF_6^-$, for example, is a suitable counter-ion.

Further suitable ionic liquids are described in PCT/EP 2007/060881, which has an earlier priority date than the present invention but was unpublished at the priority date of the present invention.

For further descriptions of ionic liquids, reference may be made to Angew. Chem. 2000, 112, 3926 to 3945, K. N. Marsh et al., Fluid Phase Equilibria 219 (2004), 93 to 98 and J. G. Huddleston et al., Green Chemistry 2001, 3, 156 to 164 and also DE-A-102 02 838, WO 2005/019137, WO 2005/007657, WO 03/029329, WO 2004/084627, WO 2005/017001 and WO 2005/017252. For example, WO 2005/007657 describes salts of 1,5-diazabicyclo[4.3.0]non-5-ene (DBN) and 1,4-diazabicyclo[5.4.0]undec-7-ene (DBU). WO 2004/084627 describes for example, as cations, cyclic amine bases such as pyridinium, pyridazinium, pyrimidinium, pyrazinium, imidazolium, pyrazolium, oxazolium, 1,2,3- and 1,2,4-triazolium, thiazolium, piperidinium, pyrrolidinium, quinolinium and isoquinolinium. Suitable counter-ions for 1,8-diazabicyclo [5.4.0]undec-7-enium (DBU) include for example chloride, methanesulfonate, formate, acetate, tosylate, trifluoroacetate, saccharinate, hydrogensulfate, lactathiocyanate and trifluoromethanesulfamate. The DBU ion may be substituted for example by $C_{1-12}$-alkyl radicals, in particular $C_{4-8}$-alkyl radicals. For example, 8-butyl DBU or 8-octyl DBU may be used as cation.

In accordance with the present invention, the cation used in the ionic liquid is particularly preferably a substituted or unsubstituted imidazolium cation, a substituted or unsubstituted 1,8-diazabicyclo[5.4.0]undec-7-enium cation or a mixture thereof. Useful substituents include in particular alkyl substituents, for example $C_{1-10}$-alkyl substituents. $C_{1-4}$-Alkyl substituents, in particular ethyl and methyl, are preferable for imidazolium ions. In this case, it is particularly preferable to use ethylmethylimidazolium (EMIM) or methylmethylimidazolium (MMIM) as cation. It may further be preferable to use butylmethylimidazolium (BMIM) as cation. In the case of 1,8-diazabicyclo[5.4.0]undec-7-enium cations, it is preferable to use $C_{3-10}$-alkyl substituents, in particular $C_{4-8}$-alkyl substituents. Particular preference is given here to 8-butyl DBU and 8-octyl DBU and also mixtures thereof.

The above-described anions can be used as anions for the imidazolium salts. Preferred counter-ions are preferably selected from halide, substituted or unsubstituted $C_{1-4}$-carboxylate, phosphate, $C_{1-4}$-alkyl phosphate, di-$C_{1-4}$-alkyl phosphate, $C_{1-4}$-alkylsulfonate, hydrogensulfate or mixtures thereof. Anions comprising phosphorus are generally catalytically active in polyamide preparation.

It is particularly preferable for the ionic liquid to be ethylmethylimidazolium diethylphosphate (EMIM DEP), methylmethylimidazolium dimethylphosphate (MMIM DMP) or mixtures thereof.

The ionic liquid may also comprise minor proportions of water. For example, the water content of the ionic liquid may be in the range from 0% to 5% by weight. Preferably, the water content is as low as possible.

In accordance with the present invention, polyamides are prepared by reaction of starting monomers selected from dicarboxylic acids and diamines or salts of the dicarboxylic acids and diamines, amino carboxylic acids, amino nitriles, lactams and mixtures thereof. The starting monomers may be those of any desired polyamides, for example aliphatic, partly aromatic or wholly aromatic polyamides, which may be amorphous, partly crystalline or wholly crystalline. The polyamides may have any suitable viscosities or molecular weights. Polyamides whose preparation is preferred and the starting monomers are elucidated in what follows.

Polyamides of aliphatic partly crystalline or partly aromatic and also amorphous construction of any kind and their blends, including polyether amides such as polyether block amides, are suitable. Polyamides for the purposes of the present invention include all known polyamides.

The viscosity number (VN) of such polyamides, when determined in a 0.5% by weight solution in 96% sulfuric acid at 25° C. as per ISO 307, is generally in the range from 90 to 350, preferably 110 to 240 ml/g.

Semicrystalline or amorphous resins having a (weight average) molecular weight of at least 5000, as described for example in U.S. Pat. Nos. 2,071,250; 2,071,251; 2,130,523; 2,130,948; 2,241,322; 2,312,966; 2,512,606; and 3,393,210, are preferred. Examples thereof are polyamides derived from lactams having 7 to 13 ring members, such as polycaprolactam, polycaprylolactam and polylaurolactam, and also polyamides obtained by reaction of dicarboxylic acids with diamines.

Useful dicarboxylic acids include alkanedicarboxylic acids having 6 to 12, in particular 6 to 10 carbon atoms and aromatic dicarboxylic acids. Adipic acid, azelaic acid, sebacic acid, dodecanedioic acid (=decanedicarboxylic acid) and terephthalic and/or isophthalic acid may be mentioned here as acids.

Useful diamines include in particular alkanediamines having 2 to 12, in particular 6 to 8 carbon atoms and also m-xylylenediamine, di-(a-aminophenyl)methane, di-(4-aminocyclohexyl)methane, 2,2-di(aminophenyl)propane or 2,2-di-(4-aminocyclohexyl)-propane and also p-phenylenediamine.

The process of the present invention may utilize the dicarboxylic acids and the diamines in equimolar amounts. When the diamine in question is volatile under the reaction conditions, it is also possible to use excess diamine in order that the loss may be compensated.

Preferred polyamides are polyhexamethyleneadipamide (nylon 66, PA 66) and polyhexamethylenesebaccamide (PA 610), polycaprolactam (nylon 6, PA 6) and also copolyamides 6/66, in particular comprising from 5% to 95% by weight of caprolactam units. PA 6, PA 66 and copolyamides 6/66 are particularly preferred.

There may also be mentioned polyamides obtainable for example by condensation of 1,4-diaminobutane with adipic acid at elevated temperature (nylon-4,6). Methods of making polyamides of this structure are described for example in EP-A 38 094, EP-A 38 582 and EP-A 39 524.

Further examples are polyamides obtainable by copolymerization of two or more of the aforementioned monomers, or mixtures of two or more polyamides, in which case the mixing ratio is freely chooseable.

Such partly aromatic copolyamides as PA 6/6T and PA 66/6T whose triamine content is less than 0.5% and preferably less than 0.3% by weight (see EP-A 299 444) will also be found particularly advantageous. The production of partly aromatic copolyamides having a low triamine content, for example, can be carried out by following the processes described in EP-A 129 195 and 129 196.

The following, nonconclusive schedule comprises the polyamides mentioned and also further polyamides within the meaning of the invention (the monomers are reported between parentheses):
PA 26 (ethylenediamine, adipic acid)
PA 210 (ethylenediamine, sebacic acid)
PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA MXD6 (m-xylylenediamine, adipic acid)
PA TMDT (trimethylhexamethylenediamine, terephthalic acid)
PA 4 (pyrrolidone)
PA 6 (ε-caprolactam)
PA 7 (ethanolactam)
PA 8 (caprylolactam)
PA 9 (9-aminoundecanoic acid)
PA 12 (laurolactam)
Poly(p-phenylenediamineterephthalamide) (phenylenediamine, terephthalic acid).

These polyamides and their preparation are known. Details concerning their preparation can be found in Ullmanns Encyklopädie der Technischen Chemie, 4$^{th}$ edition, Vol. 19, pp. 39-54, Verlag Chemie, Weinmann 1980, and also Ullmanns Encyclopedia of Industrial Chemistry, Vol. A21, pp. 179-206, VCH Verlag, Weinheim 1992, and also Stoeckhert, Kunststofflexikon, pp. 425-428, Hanser Verlag Munich 1992 (head word "Polyamide" and following).

Particular preference is given to using nylon-6, nylon-66 or MXD6 polyamide (adipic acid/m-xylylenediamine).

When amino nitriles, lactams or mixtures thereof are used as starting monomers, an initial step may be to carry out a ring cleavage by water. Therefore, the present invention provides that water can be added in small amounts.

It is additionally possible according to the present invention to add functionalizing compounds capable of attaching to carboxyl or amino groups and having, for example, at least one carboxyl, hydroxyl or amino group. Such functionalizing compounds preferably comprise

- branching monomers having at least three carboxyl or amino groups,
- monomers capable of attaching to carboxyl or amino groups, for example via epoxy, hydroxyl, isocyanato, amino and/or carboxyl groups, and having functional groups selected from hydroxyl, ether, ester, amide, imine, imide, halogen, cyano and nitro groups and C—C double or triple bonds,
- and polymer blocks capable of attaching to carboxyl or amino groups, for example poly-p-aramid oligomers.

By using the functionalizing compounds it is possible to freely fine-tune the property spectrum of the resulting polyamides within wide limits.

For example, triacetonediamine compounds can be used as functionalizing monomers. These are preferably 4-amino-2,2,6,6-tetramethylpiperidine or 4-amino-1-alkyl-2,2,6,6-tetramethylpiperidine, in each of which the alkyl group has 1 to 18 carbon atoms or is replaced by a benzyl group. The amount in which the triacetonediamine compound is added to the starting monomers is preferably in the range from 0.03 to 0.8 mol %, and more preferably in the range from 0.06 to 0.4 mol %, all based on 1 mol of acid amide groups of the polyamide. For further description, reference may be made to DE-A-44 13 177.

Useful functionalizing monomers further include the compounds customarily used as regulators, such as monocarboxylic acids and dicarboxylic acids. For a description, it is likewise possible to refer to DE-A-44 13 177.

It is also possible for nonfunctionalized or functionalized polyamides to be further functionalized. In the present process for functionalizing polyamides by transamidation, the polyamides are dissolved in an ionic liquid and transamidated with functionalized monomers having at least one or two amino and/or carboxyl groups. A transamidation involves amide groups opening and reclosing, so that the functionalized monomers can be incorporated into the polymer chain. The functionalized monomers used for functionalization can correspond to the above-described functionalizing compounds, but contain at least one or two amino and/or carboxyl groups.

The ionic liquid used as a solvent can also serve as a catalyst for the transamidation, permitting transamidation under gentle conditions.

The process of the present invention can be carried out as a continuous operation or as a batch operation. Depending on the molecular weight or viscosity desired for the polyamide obtained, the reaction can be carried out with water removal. The water generated in the course of a polycondensation is typically dissolved in the ionic liquid, and an equilibrium value results for the viscosity or molecular weight. Water removal, for example through evaporation, makes it possible to shift the equilibrium toward higher viscosities and higher molecular weights.

Water removal can be performed for example by means of evaporators such as thin film evaporators.

Transamidation is a way of introducing functionalities into any desired industrial polyamides.

The process of the present invention also provides partly or wholly aromatic polyamides. Unlike existing production processes, sulfuric acid is not needed as a solvent and there is no need to use acyl chlorides of the aromatic dicarboxylic acids. Nor is it necessary to add triphenyl phosphite as an activating compound, as in the prior art. This enables in particular the preparation of wholly aromatic polyamides from p-phenylenediamine and terephthalic acid in a straightforward and inexpensive manner.

The polyamides can be directly spun from the ionic liquids, in which case the spun filaments are obtainable for example by precipitation in a liquid precipitant medium such as water. Precipitations in other protic solvents such as $C_{1-4}$-alkanols or mixtures thereof with water are also possible. Similarly, precipitation by freeze drying is possible. Spinning is frequently carried out with drawing, with or without air gap. Processes for spinning from solution are known per se.

The fibers may be porous or nonporous, depending on the method of coagulation. Preferably, after coagulation and removal of the ionic liquid, the fiber obtained is dried by freeze drying, achieving the formation of the porous structure. Nonporous fibers are obtainable by ordinary drying.

Foils, films or coatings are produced in particular by blade coating the dissolved polyamide onto a substrate surface, optionally spraying with protic solvents, in particular water, a $C_{1-4}$-alcohol or mixtures thereof, dipping into a precipitation or coagulation bath and subsequent drying of the foil obtained, of the film or of the coated substrate. Optionally, a foil may be drawn, similarly to the aftertreatment of the fibers. Application temperature is preferably in the range from 0 to 250° C. and more preferably in the range from 20 to 200° C.

The thickness of foils or films produced according to the present invention is fine tunable and, in accordance with the planned use, is preferably in the range from 5 to 1000 μm and more preferably in the range from 10 to 100 μm.

In one preferred embodiment of film production, coagulation in a coagulation bath, generally comprising a protic solvent, for example water, a $C_{1-4}$-alkanol or mixtures thereof, may be preceded by vapor treatment with a protic solvent, for example water, a $C_{1-4}$-alkanol or mixtures thereof. To obtain very substantially closed surfaces, dipping into the coagulation bath is carried out immediately. To obtain porous surfaces, vapor treatment with the protic solvent is carried out initially.

The fibers, foils, films or coatings may be produced for example by drying under reduced pressure or else by freeze drying. To produce porous structures having a substantially porous surface, it is advantageous for the film, for example blade coated onto a hot glass plate from an as described hot solution, to be treated with water vapor for a period ranging from 1 to 20 minutes, preferably from 2 to 10 minutes and in particular from 3 to 7 minutes, and only then be dipped into a precipitant or coagulation bath. A film thus produced and freeze dried displays the described porous structure on the inside and also has an open-pore surface.

To produce porous coatings, the solution of a preferably polar polymer is as described above blade coated onto a woven, knit or nonwoven fabric which may consist for example of polyamide, polyester, polypropylene or some other synthetic or natural fiber. The dissolved polyamide is then sprayed with water, alcohol or a mixture thereof, with or without admixture of ionic liquids, and then dipped into a precipitant or coagulation bath. The polymer precipitates and the coating thus obtained is notable for good fabric attachment. The coating displays a uniformly porous structure, similar or identical to the structure described above for fibers. Add-on is preferably in the range from 5 to 500 μm, more preferably in the range from 10 to 400 μm and in particular in the range from 20 to 200 μm.

It is further possible according to the present invention to precipitate the product polyamides by contacting with a coagulation medium, in which case any desired suitable three-dimensional structures are obtainable in the course of precipitation.

The process of the present invention makes it possible to fix the desired properties for the polyamide being produced, such as its relative viscosity, depending on the subsequent further treatment or further processing.

The process of the present invention is typically carried out at ambient pressure. However, it can also be carried out at elevated or reduced pressure, for example in the range from 5 mbar to 3 bar.

The reaction time is typically in the range from 0.5 to 250 hours and more preferably in the range from 10 to 50 hours.

The examples which follow illustrate the invention.

EXAMPLES

General Procedure

The experimental setup consists of a 250 ml capacity three-neck flask connected to a nitrogen purging/stripping system. The reaction temperature was checked with a thermometer. A 20% by weight solution of the salt or monomer of the desired polyamide in EMIM DEP (ethylmethylimidazole diethylphosphate) solution was prepared at ambient temperature and ambient pressure. The reaction mixture was then heated to a temperature of 150° C. for the desired reaction time with continuous stirring with or without stripping with nitrogen. At the end of the run, the product was obtained by precipitating in water and subsequent drying.

Example 1

Polycondensation of 66 Salt in EMIM DEP for Preparing Nylon-6,6 at 150° C.

The polycondensation reaction is relatively fast, and after equilibrization after about 16 hours the rate-determining step is the water removal. The table below shows the effect of the reaction time on the consumption of end groups and the viscosity buildup. About 85% conversion is reached after 16 hours. This is the equilibrium value in a closed system (i.e., system in which no water removal occurs). The heating of the reaction mixture fore longer periods does not significantly alter the viscosity, but only leads to a loss of diamine. The results are summarized in table 1.

TABLE 1

| Time [h] | Mw [g/mol] | VN [ml/g] | Carboxyl meq/kg | Amine meq/kg |
|---|---|---|---|---|
| 16 | 2700 | 9.1 | 1326 | 778 |
| 24 | — | 10.8 | 1262 | 352 |
| 48 | 6400 | 13.7 | 1134 | 135 |
| 168 | 9200 | 17.6 | 250 | 64 |

Table 1 reveals that 85 to 90% conversion takes place in the first 16 hours of the experiment. Thereafter, the reaction appears to be very slow. It can likewise be determined that the amino end group content is reduced by evaporation.

Example 2

To show that the rate-determining step is the water removal and not the unbalanced stoichiometry, an excess of diamine (hexamethylenediamine) was added. The results are summarized below in table 2.

TABLE 2

| HMD mol % | Carboxyl meq/kg | Amine meq/kg | VN [ml/g] |
|---|---|---|---|
| 0 | 1134 | 135 | 13.7 |
| 1 | 854 | 390 | 11.3 |
| 5 | 1257 | 339 | 10.2 |
| 10 | 858 | 385 | 11.7 |

It is clear from table 2 that the addition of excess hexamethylenediamine appears to have no significant effect on the equilibrium of the system.

Example 3

To demonstrate the effect of water removal on the rate of reaction, the reaction mixture was stripped with nitrogen. It is clear from table 3 that the stripping of water shifts the equilibrium and leads to higher conversions of more than 95%. From that it can be concluded that the water removal is the rate-determining step for this system.

TABLE 3

| Time [h] | VN [ml/g] | Carboxyl meq/kg | Amine meq/kg | |
|---|---|---|---|---|
| 24 | 10.8 | 1262 | 352 | no stripping |
| 24 | 21.9 | 288 | 53 | stripping |

Example 4

To show that polymers can be synthesized with high viscosity in ionic liquids as long as water is effectively removed, 66 salt was heated in a closed autoclave to equilibrium conversion and then dried. The resulting prepolymer had a viscosity number of about 22 ml/g. This prepolymer was dissolved in EMIM-DEP and heated to 150° C. for 24 hours. The polymer obtained had a viscosity number of about 60 ml/g. The results are summarized in table 4.

TABLE 4

| Time [h] | VN [ml/g] | Carboxyl meq/kg | Amine meq/kg |
|---|---|---|---|
| 0 | 21.8 | 719 | 732 |
| 24 | 59.9 | 312 | 62 |

The reaction ends at 312 mmol/g of carboxyl end groups, which corresponds to the new equilibrium. As is apparent from the above results, the use of ionic liquids, in this case the use of EMIM-DEP, permits the synthesis of polyamide at very low temperatures of 150° C. There is no end group degradation, instead the removal of water leads to higher viscosities.

Example 5

Synthesis of Copolyamide (Functionalization of Nylon-6,6 with Sebacic Acid)

A transamidation reaction was carried out using nylon-6,6 and sebacic acid with hexamethylenediamine in EMIM-DEP at 150° C. The results are summarized in table 5 below.

TABLE 5

| Time [h] | VN [ml/g] | Carboxyl meq/kg | Amine meq/kg |
|---|---|---|---|
| 0 | 159 | — | — |
| 8 | 155 | 64 | 51 |

The reaction is relatively fast, and the functional monomer can be inserted into the standard polymer by transamidation. The water removal, which was the rate-determining step in the previous system, should not be a problem in this case, since most of the water was already removed during the synthesis of the nylon-6,6 polymer. DSC measurements show that sebacic acid was incorporated in the nylon-6,6, as is apparent from the melt and crystallization peaks.

Example 6

Synthesis of Semiaromatic and Aromatic Polyamide

Polyamide 6T was polymerized from hexamethylenediamine and terephthalic acid in EMIM-DEP at 150° C. for 48 hours. The carboxyl group content measured corresponds to the equilibrium value. This shows that ionic liquids permit the synthesis of semiaromatic polyamides at 150° C. The results are summarized in table 6.

TABLE 6

| Time [h] | VN [ml/g] | Carboxyl meq/kg | Amine meq/kg |
|---|---|---|---|
| 48 | 10 | 1234 | 144 |
| 48 | 8.6 | 1614 | 1671 |

To check whether wholly aromatic polyamides (polyphenyleneamide) can also be prepared in EMIM-DEP from an acid monomer, equimolar amounts of terephthalic acid and p-phenylenediamine were dissolved in EMIM-DEP. After heating to 150° C. and stirring for 48 hours, the product was collected and analyzed. Again it was observed that the conversion had reached the equilibrium value. The great advantage here is that the polymerization can be carried out in the presence of terephthalic acid and there is no need to use terephthaloyl chloride.

I claim:

1. A process for preparing polyamides by reacting starting monomers selected from the group consisting of dicarboxylic acids and diamines, salts of dicarboxylic acids and diamines, amino carboxylic acids, amino nitriles, lactams and mixtures thereof, in the presence of water and/or of functionalizing compounds capable of attaching to carboxyl or amino groups, wherein the functionalizing compounds are selected from the group consisting of:
   branching monomers having at least three carboxyl or amino groups,
   monomers capable of attaching to carboxyl or amino groups, and having functional groups selected from hydroxyl, ether, ester, amide, imine, imide, halogen, cyano and nitro groups,
   and polymer blocks capable of attaching to carboxyl or amino groups,
which process comprises performing the reaction in an ionic liquid as solvent without use of additional accelerants, wherein the ionic liquid is ethylmethylimidazolium diethylphosphate (EMIM DEP), methylmethylimidazolium dimethylphosphate (MMIM DMP) or a mixture thereof, and wherein the reaction is carried out at a temperature in the range from 130° C. to 170° C.

2. The process according to claim 1 wherein the reaction is performed with water removal.

3. The process according to claim 1 wherein the polyamides are selected from the following list, in which the starting monomers are indicated between parentheses:
   PA 26 (ethylenediamine, adipic acid)
   PA 210 (ethylenediamine, sebacic acid)
   PA 46 (tetramethylenediamine, adipic acid)
   PA 66 (hexamethylenediamine, adipic acid)
   PA 69 (hexamethylenediamine, azelaic acid)
   PA 610 (hexamethylenediamine, sebacic acid)
   PA 612 (hexamethylenediamine, decanedicarboxylic acid)
   PA 613 (hexamethylenediamine, undecanedicarboxylic acid)
   PA 1212 (1,12-dodecanediamine, decanedicarboxylic acid)
   PA 1313 (1,13-diaminotridecane, undecanedicarboxylic acid)
   PA MXD6 (m-xylylenediamine, adipic acid)
   PA TMDT (trimethylhexamethylenediamine, terephthalic acid)
   PA 4 (pyrrolidone)
   PA 6 (ε-caprolactam)
   PA 7 (ethanolactam)
   PA 8 (caprylolactam)
   PA 9 (9-aminoundecanoic acid)
   PA 12 (laurolactam)
   Poly(p-phenylenediamineterephthalamide) (phenylenediamine, terephthalic acid).

4. The process according to claim 1 wherein the polyamide is nylon-6,6.

5. The process according to claim 1 wherein the polyamide is polyamide 6T, the starting monomers of which are hexamethylenediamine and terephthalic acid.

* * * * *